G. H. RICH.
SEPARATING MACHINE.
APPLICATION FILED MAR. 13, 1908.
914,076.
Patented Mar. 2, 1909.
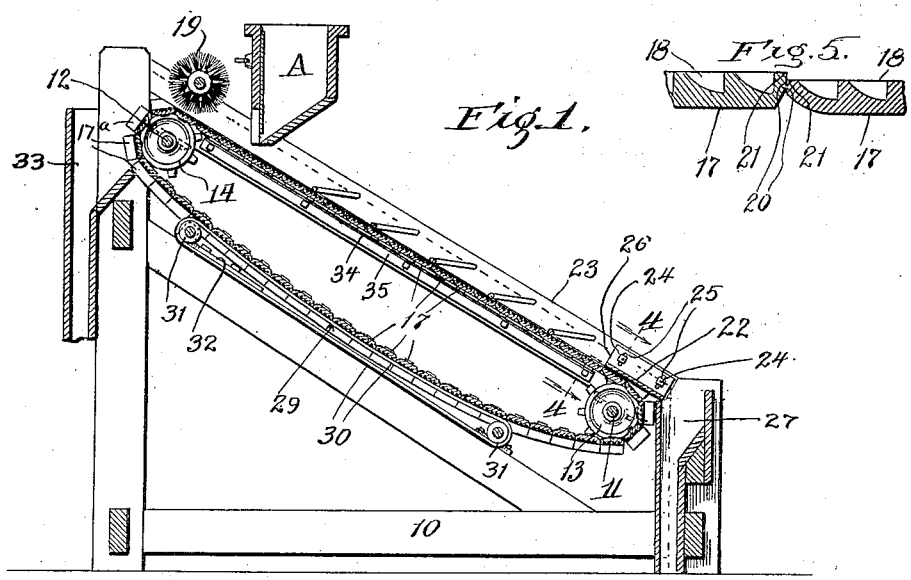
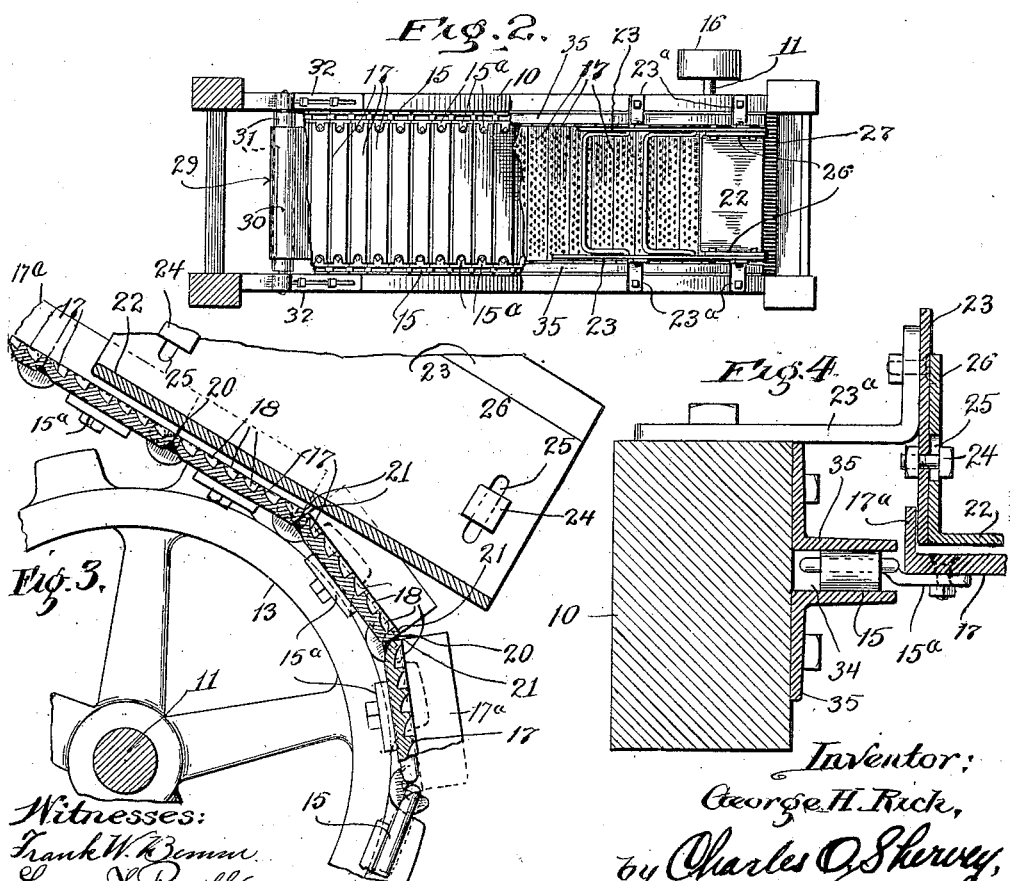

UNITED STATES PATENT OFFICE.

GEORGE H. RICH, OF CHICAGO, ILLINOIS.

SEPARATING-MACHINE.

No. 914,076.  Specification of Letters Patent.  Patented March 2, 1909.

Application filed March 13, 1908. Serial No. 420,768.

*To all whom it may concern:*

Be it known that I, GEORGE H. RICH, a citizen of the United States, residing at Chicago, in the county of Cook and State of Illinois, have invented a new and useful Improvement in Separating-Machines, of which the following is a specification.

My invention relates to improvements in separating machines.

The purpose of machines of this type is to separate the large from the small oats or other grains, and to free the large oats or grains from small seeds or grains, seeds of various weeds and the like.

The object of my invention is to simplify, cheapen and otherwise improve machines of this class, and to such end the invention consists in certain novel features of construction and arrangement, a description of which will be found in the following specification and the essential features of which will be more definitely pointed out in the claims.

In the drawings furnished herewith, Figure 1 is a central, longitudinal section through a machine embodying my invention; Fig. 2 is a plan view with certain parts of the frame and apron broken away; Fig. 3 is a detail longitudinal section through a fragment of the apron, Fig. 4 is a detail cross-section taken on line 4—4 Fig. 1, and Fig. 5 is a detail section through two adjacent apron plates.

In these views 10, is the framework of the machine, in which are journaled two shafts 11, 12, which bear sprocket wheels, 13, 14, over which run sprocket chains 15. The shaft 12, is set higher up in the frame than the shaft 11, so that the sprocket chains must necessarily travel in an inclined direction. The lower shaft 11, is the drive shaft of the machine and bears a pulley, or other drive wheel 16, which may be belted or geared to any suitable source of power.

The two chains are connected by plates 17, each link of the chains being formed with an ear $15^a$, upon which one of the plates is fastened. The plates contain depressions or pockets 18, which receive and carry up the small particles, which it is desired to remove from the oats, and said depressions are of such shape and size that a full size oat cannot be wholly contained within the depression, but must project above the surface of the plate. A brush 19, is provided at the upper end of the machine for brushing back any grain which may be carried up to it, and consequently any grain which lies in the depressions and projects up above the face of the apron will be brushed back. The plates 17, have flanges $17^a$, upon their two ends, which travel behind rails 23, supported on the frame 10, by brackets $23^a$.

The pivot lines of the links of the two chains are arranged in the planes of the meeting edges 20, of the plates and preferably about one-sixteenth of an inch below the pocketed face of the plates, the result being that when the links pass around the sprocket wheels, the corners 21, of the edges 20, open and close slightly and will pinch or squeeze any grain that may be caught between them. To avoid this difficulty I have provided a deflecting plate 22, which is placed above the apron at the lower sprocket wheels, which plate catches the grain and prevents it from continuing down the apron and being caught between the meeting edges of the plates. The deflecting plate 22, is adjustably supported, as by securing it upon the guide-rail 23, by bolts and nuts 24, the bolts passing through slots 25, in flanges 26, which are formed on the plate 22. By reason of this adjustable connection the deflecting plate may be raised or lowered and properly adjusted with respect to the apron. It is obvious that the grain, when it reaches the deflecting plate cannot roll down between the plate and apron, but will pass on over the top of the plate and fall into the hopper 27, from which it may be conveyed to any point desired.

It is evident that when the chains elongate from wear upon the pivots of the links, the plates must necessarily separate slightly, and this is objectionable, because grain will be caught between the edges of the plates and be carried upward, thus tending to clog the machine and interfere with the downward movement of the free grain. To overcome this difficulty, I apply the power to the lower shaft 11, and push the upper bight of the chain upward along the incline, thus tending at all times to crowd the plates together and hold them in perfect contact with each other. The upper bight of the apron runs in guideways 34, preferably formed by angle irons 35, and the upper bight is therefore kept from buckling or sagging. A support 29, is provided to carry the lower bight of the apron to prevent the weight of this part of the apron from pulling apart the plates on the upper bight of the apron. As shown, the support 29, comprises a belt 30, and two suitably supported rollers 31, which carry the belt 30. The bearings 32, of one of the rollers are adjustably mounted upon the frame 10, so that the slack in the belt 30, may be taken up in case it stretches from the wear upon it.

The uncleaned oats, or other grain, is fed upon the apron through a hopper A, and tumbles down over the apron. The apron is forced up the incline and the small particles lodge in the depressions in the plates and are carried upward and discharged into a hopper 33. The large grain continues to roll down the inclined apron, and eventually rolls over the deflecting plate 22, and into the hopper 27.

It is evident that inasmuch as the upper corners 21, of the meeting edges of the plates may separate in passing around the sprockets without damage to the grain, the exact position of the pivots of the links of the chains is immaterial, except that they must be somewhere in the plane of the meeting edges of the plates, so that no particular care and skill is required in affixing the plates to the chains, and further, that inasmuch as the apron is pushed up the incline the stretching of the chains will in nowise affect the perfect operation of the machine. Furthermore, by reason of the square edges 20, there is no danger of any grain being caught between the upper corners 21, as is the case were the edges 20 beveled back from said corners 21. It is one of the practical difficulties in machines of this class to maintain the adjacent corners 21, in alinement with each other, as it frequently happens that the plates are slightly warped or not true in some respect, so that one corner 21, is apt to lie above the corner 21 on the adjacent plate as shown in Fig. 5. A slight variation or unevenness can cause no material harm when the edges are square, but where they are beveled back from the corner and one of the corners sags below its adjacent one, an opening is made through which the oats or other grain will fall, or will become fastened and carried up and discharged into the hopper 33.

I am aware that various alterations and modifications of the exact form and arrangement of the device are possible without departing from the spirit of my invention, and I do not therefore desire to limit myself except as may be necessary by the state of the art to which this invention pertains.

I claim as new and desire to secure by Letters Patent:

1. In a separating machine, the combination of an inclined traveling apron comprising a series of pocketed plates having abutting edge portions which extend at right angles to the pocketed faces and are beveled back beyond said right angled portions, sprocket chains carrying said plates and secured thereon with their pivotal lines located in line with the meeting edges and between the upper and lower faces of the plates and sprocket wheels for carrying said chains, the lower sprocket wheels of which are the driving wheels and act to force each member of the upper bight of the apron in an upwardly inclined direction and against its fellow member.

2. In a separating machine, the combination of an inclined traveling apron comprising a series of pocketed plates carried by sprocket chains secured upon their opposite ends and having abutting edges which extend at right angles to the pocketed faces of the plates and are beveled back beyond such right angle portions, sprocket wheels carrying said chains, the lower sprocket wheels of which are the driving wheels and act to force each member of the upper bight of the apron in an upwardly inclined direction and against its fellow member, and a support for the lower bight of the chain arranged to remove the weight of the lower bight of the chain from the upper bight.

3. In a separating machine, the combination of a supporting frame work having upwardly inclined guideways supported thereon, sprocket wheels located adjacent to said guideways, the lower sprocket wheels of which are the driving sprockets, an apron traveling in said guideways and moved by said lower sprocket wheels and comprising pocketed plates, the meeting edges of which have parallel faces adapted to abut each other, and inclined portions extending away from the lower edges of said faces, chains connecting said plates and extending around the sprocket wheels, a pair of rollers supported upon the frame work below the lower bight of the apron and a belt encircling said rollers and adapted to form a support for the lower bight of the apron, whereby the weight of the lower bight will be taken off the upper bight.

4. In a separating machine, a separating mechanism comprising sprocket wheels, an upwardly inclined traveling apron extending around said sprocket wheels and comprising pocketed plates, the contiguous edges of which have abutting faces which extend at right angles to the pocketed faces of the plates and other portions that are beveled away from said abutting faces, and plate carrying chains, the pivot lines of which are arranged in the meeting lines of the plates, and between the upper and lower faces thereof.

GEORGE H. RICH.

Witnesses:
 CHARLES O. SHERVEY,
 FRANK W. BEMM.